(12) United States Patent
Arimoto et al.

(10) Patent No.: US 7,723,423 B2
(45) Date of Patent: May 25, 2010

(54) GAS-BARRIER RESIN COMPOSITION

(75) Inventors: Kikuo Arimoto, Tsukuba (JP); Keisuke Morikawa, Kurashiki (JP); Nobuhiro Moriguchi, Kurashiki (JP); Kohta Isoyama, Kurashiki (JP); Arthur Leroy Berrier, Simpsonville, SC (US)

(73) Assignees: Cryovac, Inc., Duncan, SC (US); Kuraray Co., Ltd., Kurashiki (JP)

( * ) Notice: Subject to any disclaimer, the term of this patent is extended or adjusted under 35 U.S.C. 154(b) by 867 days.

(21) Appl. No.: 11/488,122

(22) Filed: Jul. 18, 2006
(Under 37 CFR 1.47)

(65) Prior Publication Data

US 2007/0093599 A1 Apr. 26, 2007

Related U.S. Application Data

(63) Continuation-in-part of application No. 11/184,504, filed on Jul. 19, 2005.

(51) Int. Cl.
*C08G 63/91* (2006.01)
(52) U.S. Cl. .................. 524/503; 524/458; 524/803; 526/201; 525/201
(58) Field of Classification Search ............... 525/201; 524/458, 503, 803; 526/201
See application file for complete search history.

(56) References Cited

U.S. PATENT DOCUMENTS

| | | | |
|---|---|---|---|
| 6,153,714 | A | 11/2000 | Bansleben et al. |
| 6,203,923 | B1 | 3/2001 | Bansleben et al. |
| 6,506,860 | B1 | 1/2003 | Bansleben et al. |
| 2006/0149009 | A1 | 7/2006 | Arimoto et al. |

FOREIGN PATENT DOCUMENTS

| | | | |
|---|---|---|---|
| WO | WO 99/50331 | | 10/1999 |
| WO | WO 9950331 A1 * | | 10/1999 |
| WO | WO 00/18579 | | 4/2000 |
| WO | WO 0018579 A1 * | | 4/2000 |
| WO | WO 03/078499 A2 | | 9/2003 |
| WO | WO 03078499 A2 * | | 9/2003 |

OTHER PUBLICATIONS

Meier ["Neue cycloaliphatische Polymere und Polymerdispersionen durch ubergangsmetallkatalysierte Polymerisation cyclischer Olefine und polymeranaloge Reaktionen" [Online] Jun. 2, 2003].*
Ramakrishnan S. ("Well-Defined Ethylene-vinyl alcohol copolymers via hydroboration: Control of composition and distribution of the hydroxyl groups on the polymer backbone" Macromolecules, ACS, Washington, DC, US, vol. 24, 1991, pp. 3753-3759).*
S. Ramakrishnan, XP-002251245, Well-Defined Ethylene-Vinyl Alcohol Copolymers via Hydroboration: Control of Composition and Distribution of the Hydroxyl Groups on the Polymer Backbone:, Macromolecules, vol. 24, No. 13, 1991, pp. 3753-3759.
Stefan Meier, XP-002412844, "Neue cycloaliphatische Polymere und Polymerdispersionen durch uebergangsmetallkatalysierte Polymerisation cyclischer Olefine und polymeranaloge Reaktionen" Freiburg I BR., Jun. 2, 2003, pages 65-88.

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

A resin composition includes a polymer (A) mainly containing a structural unit represented by following Formula (1):

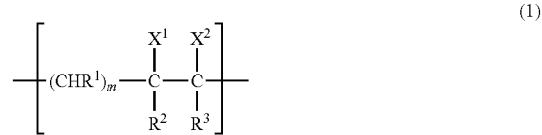

(1)

wherein m represents an integer of 2 to 10; $X^1$ and $X^2$ are each hydrogen atom, hydroxyl group or a functional group that can be converted into a hydroxyl group, wherein at least one of $X^1$ and $X^2$ is hydroxyl group or a functional group that can be converted into hydroxyl group; $R^1$, $R^2$ and $R^3$ are each hydrogen atom, hydroxyl group, a functional group that can be converted into hydroxyl group, an alkyl group, an aryl group, an aralkyl group or a heteroaryl group, wherein the plural $R^1$s may be the same as or different from each other; and a vinyl alcohol polymer (B).

19 Claims, No Drawings

GAS-BARRIER RESIN COMPOSITION

REFERENCE TO RELATED CASES

This application is a Continuation-in-Part application of U.S. application Ser. No. 11/184,504, incorporated herein by reference.

BACKGROUND OF THE INVENTION

1. Field of the Invention

The present invention relates to resin compositions and films and other molded articles of the resin compositions that have excellent gas barrier properties.

2. Description of the Related Art

Polymers having functional groups such as hydroxyl group in the molecule show various physical properties such as hydrophilicity or adhesiveness derived from the functional groups. Thus, they can be used as, for example, structural components for functional packaging materials, functional molding materials, sheets, films, fibers, coating agents, functional alloys and blends. A variety of such polymers have been synthesized. For example, PCT International Publication No. WO 99/50331 discloses a polymer represented by following Formula (2):

(2)

wherein X and Y are each hydroxyl group, carboxyl group, carboxylic ester group, amide group, nitrile group or carbonyl group; R is an alkyl group having 1 to 5 carbon atoms or aforementioned X; a and b are each an integer of 0 to 6 and the total of a and b is from 2 to 7, prepared by ring-opening metathesis polymerization of a cycloalkene compound containing 7 to 12 carbon atoms and having a functional group, such as 5-cyclooctene-1,2-diol; and a polymer prepared by hydrogenation of the double bond in the molecular chain of the polymer just mentioned above.

Such polymers can be molded by melt process and are very excellent resin materials that show high gas barrier properties at high humidity. In particular, a polymer prepared by hydrogenation of the polymer of Formula (2) in which X and Y are hydroxyl groups is useful as a constitutional component for packaging materials having high oxygen-barrier properties (PCT International Publication No. WO 00/18579).

SUMMARY OF THE INVENTION

To develop higher gas barrier properties, a resin constituting a gas barrier material should preferably be crystallized sufficiently. However, since the polymers mentioned above may have a relatively low crystallization rate, they may require heat treatment for a long time in molding and processing and thereby invite higher cost. Accordingly, an object of the present invention is to provide a resin composition that shows high gas barrier properties at high humidity even when it is subjected to heat treatment in a short time and can be molded by melt processes.

The present inventors have found that a resin composition containing a specific polymer mentioned below and a vinyl alcohol polymer can have a remarkably increased crystallization rate and can be subjected to heat treatment in a shorter time in molding and processing without deteriorating its gas barrier properties. The present invention has been accomplished based on these findings.

In one embodiment, the present invention provides a resin composition including a polymer (A) mainly containing a structural unit represented by the following Formula (1):

$$\left[ (CHR^1)_m - \underset{R^2}{\overset{X^1}{\underset{|}{C}}} - \underset{R^3}{\overset{X^2}{\underset{|}{C}}} \right] \quad (1)$$

wherein m represents an integer of 2 to 10; $X^1$ and $X^2$ are each hydrogen atom, hydroxyl group or a functional group that can be converted into a hydroxyl group, wherein at least one of $X^1$ and $X^2$ is a hydroxyl group or a functional group that can be converted into hydroxyl group; $R^1$, $R^2$ and $R^3$ are each a hydrogen atom, a hydroxyl group, a functional group that can be converted into hydroxyl group, an alkyl group, an aryl group, an aralkyl group or a heteroaryl group, wherein the plural $R^1$s may be the same as or different from each other; and a vinyl alcohol polymer (B). The present invention further provides a molded article containing the resin composition.

The resin composition according to the present invention can be molded by melt processes, has high gas barrier properties, especially against oxygen gas, even at high humidity and can develop high gas barrier properties even when it is subjected to heat treatment in a short time in molding and processing. The resin composition can yield molded articles having excellent gas barrier properties.

Further objects, features and advantages of the present invention will become apparent from the following description.

DETAILED DESCRIPTION OF THE INVENTION

The resin composition contains a polymer (A) comprising a structural formula represented by following Formula (1):

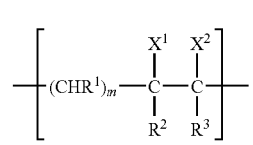

(1)

wherein m represents an integer of 2 to 10; $X^1$ and $X^2$ are each hydrogen atom, hydroxyl group or a functional group that can be converted into a hydroxyl group, wherein at least one of $X^1$ and $X^2$ is hydroxyl group or a functional group that can be converted into hydroxyl group; $R^1$, $R^2$ and $R^3$ are each a hydrogen atom, a hydroxyl group, a functional group that can be converted into hydroxyl group, an alkyl group, an aryl group, an aralkyl group or a heteroaryl group, wherein the plural $R^1$s may be the same as or different from each other.

In Formula (1), $X^1$ and $X^2$ are each hydrogen atom, hydroxyl group or a functional group that can be converted into hydroxyl group, wherein at least one of $X^1$ and $X^2$ is hydroxyl group or a functional group that can be converted into hydroxyl group.

Examples of the functional group that can be converted into hydroxyl group include epoxy group, and a hydroxyl group protected by a protecting group. The epoxy group may be a three-membered ring formed by the carbon atom to which $X^1$ is bound, the carbon atom to which $X^2$ is bound and oxygen atom.

Examples of the protecting group of hydroxyl group mentioned above include alkyl groups such as methyl group, ethyl group and t-butyl group; alkenyl groups such as allyl group; aralkyl groups such as benzyl group; aryl groups such as phenyl group; alkoxyalkyl groups such as methoxymethyl group, methoxyethyl group and ethoxyethyl group; acyl groups such as acetyl group, propionyl group and benzoyl group; alkoxycarbonyl groups such as methoxycarbonyl group, ethoxycarbonyl group, t-butoxycarbonyl group, phenyloxycarbonyl group and benzyloxycarbonyl group; silyl groups such as trimethylsilyl group and t-butyldimethylsilyl group.

For easy protection and deprotection, preferred examples of the hydroxyl-protecting group are alkoxyalkyl groups such as methoxymethyl group, methoxyethyl group and ethoxyethyl group; acyl groups such as acetyl group, propionyl group and benzoyl group; alkoxycarbonyl groups such as methoxycarbonyl group, ethoxycarbonyl group, t-butoxycarbonyl group, phenyloxycarbonyl group and benzyloxycarbonyl group; and silyl groups such as trimethylsilyl group and t-butyldimethylsilyl group. Particularly, the hydroxyl group is preferably protected by an acyl group such as acetyl group, propionyl group or benzoyl group, because such a group can be industrially prepared at low cost.

In Formula (1), both of $X^1$ and $X^2$ are preferably a hydroxyl group and/or a functional group that can be converted into hydroxyl group. By using the polymer (A) mainly comprising the structural unit represented by Formula (1), the resin composition can have a higher gas barrier properties.

$R^1$, $R^2$ and $R^3$ in Formula (1) are each hydrogen atom, hydroxyl group, a functional group that can be converted into hydroxyl group, an alkyl group, an aryl group, an aralkyl group or a heteroaryl group. The plural $R^1$s may be the same as or different from each other.

Examples of the functional group that can be converted into hydroxyl group for use as $R^1$, $R^2$ and $R^3$ include those exemplified as the functional groups that can be converted into hydroxyl group for use as $X^1$ and $X^2$.

The alkyl group is preferably an alkyl group having one to five carbon atoms. Examples of such alkyl group include aliphatic chain alkyl groups such as methyl group, ethyl group, propyl group, isopropyl group, n-butyl group, isobutyl group and n-pentyl group; and alicyclic alkyl groups such as cyclopentyl group.

Examples of the aryl group include phenyl group, naphthyl group, biphenyl group, phenanthryl group, anthryl group, triphenylenyl group and pyrenyl group.

Examples of the aralkyl group include benzyl group, phenethyl group, naphthylmethyl group and biphenylmethyl group.

Examples of the heteroaryl group include pyridyl group, quinolyl group, isoquinolyl group, pyrrolyl group, indolyl group, furyl group, benzofuranyl group, thienyl group and benzothiophenyl group.

Examples of the structural formula represented by Formula (1) include 1,2-dihydroxybutane-1,4-diyl group, 1,2-dihydroxypentane-1,5-diyl group, 1,2-dihidroxyhexane-1,6-diyl group, 1,2-dihydroxyheptane-1,7-diyl group, 1,2-dihydroxyoctane-1,8-diyl group, 1,2-diacyloxybutane-1,4-diyl group, 1,2-diacyloxypentane-1,5-diyl group, 1,2-diacyloxyhexane-1,6-diyl group, 1,2-diacyloxyheptane-1,7-diyl group, 1,2-diacyloxyoctane-1,8-diyl group, 1,2-epoxybutane-1,4-diyl group, 1,2-epoxypentane-1,5-diyl group, 1,2-epoxyhexane-1,6-diyl group, 1,2-epoxyheptane-1,7-diyl group, 1,2-epoxyoctane-1,8-diyl group.

Among them, for the low cost and the high availability of the raw material and the polymer, preferred examples of the structural formula represented by Formula (1) are 1,2-dihydroxypentane-1,5-diyl group, 1,2-dihydroxyheptane-1,2-diol and 1,2-dihydroxyoctane-1,8-diyl group, and more preferred example of the structural formula represented by Formula (1) is 1,2-dihydroxyoctane-1,8-diyl group.

The polymer (A) for use in the present invention mainly comprises the structural unit represented by Formula (1) but may further comprise one or more structural units other than the structural unit represented by Formula (1), within ranges not deteriorating the advantages of the present invention.

Examples of such additional structural units include structural units derived from linear alkylene groups such as tetramethylene-1,4-diyl group, pentamethylene-1,5-diyl group, heptamethylene-1,7-diyl group and octamethylene-1,8-diyl group; structural units derived from branched alkylene groups such as 2-methylpentane-1,5-diyl group and 3-methylpentane-1,5-diyl group; structural units derived from alkylene group having a cyclic structure, such as cyclopentene-1,3-dimethylenediyl group.

For example the polymer (A) may contain only the structural unit of Formula 1. The polymer may contain 50 mol % or more of the structural unit of Formula 1, preferably 60 mol % or more, more preferably 75 mol % or more and even more preferably 95 mol % or more, where mol % is based on the total number of moles of all structural units in the polymer (A), for higher gas barrier properties of the resin composition.

The polymer (A) can have any molecular weight but preferably has a number-average molecular weight of 1,000 to 1,000,000, more preferably 1,000 to 200,000, and further preferably 1,000 to 80,000. The polymer (A) having a number-average molecular weight (Mn) within the above range contributes to provide a resin composition that can be satisfactorily molded by melt process.

The polymer (A) can be prepared by any method. For example, it can be prepared by subjecting a cyclic olefin compound to ring-opening metathesis polymerization and hydrogenating the resulting polymer.

Examples of the cyclic olefin compound include
3-cyclopenten-1-ol, 1-acetoxy-3-cyclopentene,
1-t-butoxy-3-cyclopentene,
1-methoxycarbonyloxy-3-cyclopentene,
1-trimethylsiloxy-3-cyclopentene,
2-cyclopenten-1-ol, 1-acetoxy-2-cyclopentene,
1-t-butoxy-2-cyclopentene,
1-methoxycarbonyloxy-2-cyclopentene,
1-trimethylsiloxy-2-cyclopentene,
3-cyclopentene-1,2-diol, 1,2-epoxy-3-cyclopentene,
1,2-diacetoxy-3-cyclopentene,
1,2-di-t-butoxy-3-cyclopentene,
1,2-di(methoxycarbonyloxy)-3-cyclopentene,
1,2-di(trimethylsiloxy)-3-cyclopentene,
2-cyclohepten-1-ol, 1-acetoxy-2-cycloheptene,
1-t-butoxy-2-cycloheptene,
1-methoxycarbonyloxy-2-cycloheptene,
1-trimethylsiloxy-2-cycloheptene,
3-cyclohepten-1-ol, 1-acetoxy-3-cycloheptene,
1-t-butoxy-3-cycloheptene,
1-methoxycarbonyloxy-3-cycloheptene,
1-trimethylsiloxy-3-cycloheptene,
4-cyclohepten-1-ol, 1-acetoxy-4-cycloheptene,
1-t-butoxy-4-cycloheptene,
1-methoxycarbonyloxy-4-cycloheptene, 1-trimethylsiloxy-4-cycloheptene,
3-cycloheptene-1,2-diol, 1,2-epoxy-3-cycloheptene,
1,2-diacetoxy-3-cycloheptene,
1,2-di-t-butoxy-3-cycloheptene,
1,2-di(trimethylsiloxy)-3-cycloheptene,
1,2-di(methoxycarbonyloxy)-3-cycloheptene,
4-cycloheptene-1,2-diol, 1,2-epoxy-4-cycloheptene,
1,2-diacetoxy-4-cycloheptene,
1,2-di-t-butoxy-4-cycloheptene,
1,2-di(trimethylsiloxy)-4-cycloheptene,
1,2-di(methoxycarbonyloxy)-4-cycloheptene,
2-cycloocten-1-ol, 1-acetoxy-2-cyclooctene,
1-t-butoxy-2-cyclooctene,
1-methoxycarbonyloxy-2-cyclooctene,
1-trimethylsiloxy-2-cyclooctene,
3-cycloocten-1-ol, 1-acetoxy-3-cyclooctene,
1-t-butoxy-3-cyclooctene,
1-methoxycarbonyloxy-3-cyclooctene,
1-trimethylsiloxy-3-cyclooctene,
4-cycloocten-1-ol, 1-acetoxy-4-cyclooctene,
1-t-butoxy-4-cyclooctene,
1-methoxycarbonyloxy-4-cyclooctene,
1-trimethylsiloxy-4-cyclooctene,
3-cyclooctene-1,2-diol, 1,2-epoxy-3-cyclooctene,
1,2-diacetoxy-3-cyclooctene, 1,2-di-t-butoxy-3-cyclooctene,
1,2-di (trimethylsiloxy)-3-cyclooctene, 1,2-di(methoxycarbonyloxy)-3-cyclooctene,
4-cyclooctene-1,2-diol, 1,2-epoxy-4-cyclooctene,
1,2-diacetoxy-4-cyclooctene, 1,2-di-t-butoxy-4-cyclooctene,
1,2-di(trimethylsiloxy)-4-cyclooctene, 1,2-di(methoxycarbonyloxy)-4-cyclooctene,
5-cyclooctene-1,2-diol, 1,2-epoxy-5-cyclooctene,
1,2-diacetoxy-5-cyclooctene, 1,2-di-t-butoxy-5-cyclooctene,
1,2-di(trimethylsiloxy)-5-cyclooctene, 1,2-di(methoxycarbonyloxy)-5-cyclooctene,
3-methyl-3-cycloocten-1-ol,
1-acetoxy-3-methyl-3-cyclooctene,
1-t-butoxy-3-methyl-3-cyclooctene,
1-methoxycarbonyloxy-3-methyl-3-cyclooctene,
1-trimethylsiloxy-3-methyl-3-cyclooctene,
4-methyl-4-cycloocten-1-ol,
1-acetoxy-4-methyl-4-cyclooctene,
1-t-butoxy-4-methyl-4-cyclooctene,
1-methoxycarbonyloxy-4-methyl-4-cyclooctene,
1-trimethylsiloxy-4-methyl-4-cyclooctene,
5-methyl-4-cycloocten-1-ol,
1-acetoxy-5-methyl-4-cyclooctene,
1-t-butoxy-5-methyl-4-cyclooctene,
1-methoxycarbonyloxy-5-methyl-4-cyclooctene,
1-trimethylsiloxy-5-methyl-4-cyclooctene,
4-methyl-3-cycloocten-1-ol,
1-acetoxy-4-methyl-3-cyclooctene,
1-t-butoxy-4-methyl-3-cyclooctene,
1-methoxycarbonyloxy-4-methyl-3-cyclooctene,
1-trimethylsiloxy-4-methyl-3-cyclooctene,
4-methyl-4-cyclooctene-1,2-diol,
1,2-epoxy-4-methyl-4-cyclooctene,
1,2-diacetoxy-4-methyl-4-cyclooctene,
1,2-di-t-butoxy-4-methyl-4-cyclooctene,
1,2-di(trimethylsiloxy)-4-methyl-4-cyclooctene,
1,2-di(methoxycarbonyloxy)-4-methyl-4-cyclooctene,
5-methyl-4-cyclooctene-1,2-diol,
1,2-epoxy-5-methyl-4-cyclooctene,
1,2-diacetoxy-5-methyl-4-cyclooctene,
1,2-di-t-butoxy-5-methyl-4-cyclooctene,
1,2-di(trimethylsiloxy)-5-methyl-4-cyclooctene,
1,2-di(methoxycarbonyloxy)-5-methyl-4-cyclooctene,
5-methyl-5-cyclooctene-1,2-diol,
1,2-epoxy-5-methyl-5-cyclooctene,
1,2-diacetoxy-5-methyl-5-cyclooctene,
1,2-di-t-butoxy-5-methyl-5-cyclooctene,
1,2-di(trimethylsiloxy)-5-methyl-5-cyclooctene,
1,2-di(methoxycarbonyloxy)-5-methyl-5-cyclooctene,
1-methyl-4-cycloocten-1-ol,
1-acetoxy-1-methyl-4-cyclooctene,
1-t-butoxy-1-methyl-4-cyclooctene,
1-methoxycarbonyloxy-1-methyl-4-cyclooctene,
1-trimethylsiloxy-1-methyl-4-cyclooctene,
8-methyl-4-cycloocten-1-ol,
1-acetoxy-8-methyl-4-cyclooctene,
1-t-butoxy-8-methyl-4-cyclooctene,
1-methoxycarbonyloxy-8-methyl-4-cyclooctene,
1-trimethylsiloxy-8-methyl-4-cyclooctene,
1-methyl-5-cyclooctene-1,2-diol,
1,2-epoxy-1-methyl-5-cyclooctene,
1,2-diacetoxy-1-methyl-5-cyclooctene,
1,2-di-t-butoxy-1-methyl-5-cyclooctene,
1,2-di(trimethylsiloxy)-1-methyl-5-cyclooctene,
1,2-di(methoxycarbonyloxy)-1-methyl-5-cyclooctene,
1,4-dimethyl-4-cycloocten-1-ol,
1-acetoxy-1,4-dimethyl-4-cyclooctene,
1-t-butoxy-1,4-dimethyl-4-cyclooctene,
1-methoxycarbonyloxy-1,4-dimethyl-4-cyclooctene,
1-trimethylsiloxy-1,4-dimethyl-4-cyclooctene,
5,8-dimethyl-4-cycloocten-1-ol,
1-acetoxy-5,8-dimethyl-4-cyclooctene,
1-t-butoxy-5,8-dimethyl-4-cyclooctene,
1-methoxycarbonyloxy-5,8-dimethyl-4-cyclooctene,
1-trimethylsiloxy-5,8-dimethyl-4-cyclooctene,
1,6-dimethyl-5-cyclooctene-1,2-diol,
1,2-epoxy-1,6-dimethyl-5-cyclooctene,
1,2-diacetoxy-1,6-dimethyl-5-cyclooctene,
1,2-di-t-butoxy-1,6-dimethyl-5-cyclooctene,
1,2-di(trimethylsiloxy)-1,6-dimethyl-5-cyclooctene,
1,2-di(methoxycarbonyloxy)-1,6-dimethyl-5-cyclooctene,
1,5-dimethyl-4-cycloocten-1-ol,
1-acetoxy-1,5-dimethyl-4-cyclooctene,
1-t-butoxy-1,5-dimethyl-4-cyclooctene,
1-methoxycarbonyloxy-1,5-dimethyl-4-cyclooctene,
1-trimethylsiloxy-1,5-dimethyl-4-cyclooctene,
4,8-dimethyl-4-cycloocten-1-ol,
1-acetoxy-4,8-dimethyl-4-cyclooctene,
1-t-butoxy-4,8-dimethyl-4-cyclooctene,
1-methoxycarbonyloxy-4,8-dimethyl-4-cyclooctene,
1-trimethylsiloxy-4,8-dimethyl-4-cyclooctene,
1,5-dimethyl-5-cyclooctene-1,2-diol,
1,2-epoxy-1,5-dimethyl-5-cyclooctene,
1,2-diacetoxy-1,5-dimethyl-5-cyclooctene,
1,2-di-t-butoxy-1,5-dimethyl-5-cyclooctene,
1,2-di(trimethylsiloxy)-1,5-dimethyl-5-cyclooctene,
1,2-di(methoxycarbonyloxy)-1,5-dimethyl-5-cyclooctene,
3,7-dimethyl-3-cycloocten-1-ol,
1-acetoxy-3,7-dimethyl-3-cyclooctene,
1-t-butoxy-3,7-dimethyl-3-cyclooctene,
1-methoxycarbonyloxy-3,7-dimethyl-3-cyclooctene,
1-trimethylsiloxy-3,7-dimethyl-3-cyclooctene,
4,8-dimethyl-4-cyclooctene-1,2-diol,
1,2-epoxy-4,8-dimethyl-4-cyclooctene,
1,2-diacetoxy-4,8-dimethyl-4-cyclooctene,
1,2-di-t-butoxy-4,8-dimethyl-4-cyclooctene,
1,2-di(trimethylsiloxy)-4,8-dimethyl-4-cyclooctene and 1,2-di(methoxycarbonyloxy)-4,8-dimethyl-4-cyclooctene.

The polymer (A) can be prepared by ring-opening metathesis polymerization according to any procedure such as using a conventional metathesis polymerization catalyst. Examples of the metathesis polymerization catalyst include ruthenium carbene complexes, osmium carbene complexes, molybdenum carbene complexes and tungsten carbene complexes such as represented by following Formulae 4-10.

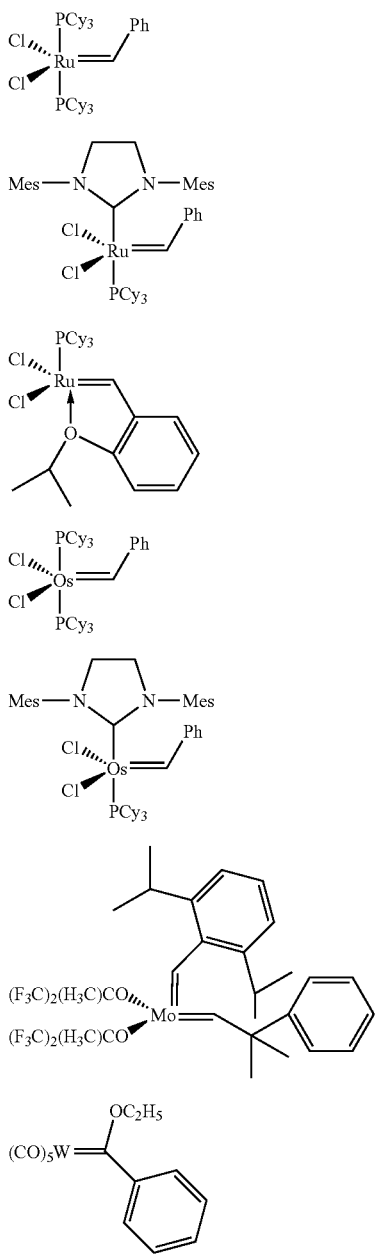

Wherein $PCy_3$ represents tricyclohexylphosphine and Mes represents 2,4,6-trimethylphenyl group. Among the metathesis polymerization catalysts, ruthenium carbene complexes are preferred for their satisfactory activity and low toxicity of the metal moiety.

The reaction can be carried out in the presence of a conventional solvent and/or chain transfer agent for use in ring-opening metathesis polymerization. Examples of the solvent include aromatic hydrocarbons such as toluene; ethers such as tetrahydrofuran; and halogenated derivatives such as methylene chloride and monochlorobenzene. An example of the chain transfer agent is 3-cis-hexen-1-ol.

The polymer (A) used in the present invention can be prepared by hydrogenating the polymer formed by ring-opening metathesis polymerization. The polymer can be hydrogenated according to a conventional hydrogenation procedure for unsaturated polymers. For example, it can be hydrogenated by introducing hydrogen in the presence of a hydrogenation catalyst such as nickel type catalyst such as Raney nickel, cobalt type catalyst such as Raney cobalt, ruthenium type catalyst such as ruthenuim on carbon, rhodium type catalyst, palladium type catalyst, platinum type catalyst, composition thereof or alloy thereof.

For preventing the undesired reactions with functional groups on the unsaturated polymers and showing higher hydrogenation catalytic activity, preferred examples of a hydrogenation catalyst are rhodium type catalyst, palladium type catalyst, platinum type catalyst, composition thereof and alloy thereof. Examples of rhodium type catalyst are tris (triphenylphosphine)rhodium chloride, and bis(1,5-cyclooctadiene) rhodium trifluoromethanesulfonate. Examples of palladium type catalyst or platinum type catalyst are palladium on carbon and platinum on carbon. Particularly, it is preferred to use the palladium on the basic carbon or the platinum on the basic carbon described in U.S. Pat. No. 6,559,241 (incorporated herein by reference in its entirety).

The vinyl alcohol polymer (B) for use in the present invention can be prepared by subjecting a vinyl ester monomer to radical polymerization, and saponifying the resulting vinyl ester polymer to thereby convert the vinyl ester unit to vinyl alcohol unit. Examples of the vinyl ester monomer include vinyl formate, vinyl acetate, vinyl propionate, vinyl laurate, vinyl stearate, vinyl benzoate, vinyl pivalate and vinyl versatate. Among them, vinyl acetate is preferred for its low cost and high availability.

Where necessary, the vinyl ester monomer can be subjected to radical polymerization in the coexistence of one or more copolymerizable monomers that can undergo copolymerization with the vinyl ester monomer within ranges not adversely affecting the advantages of the present invention. Examples of the copolymerizable monomers include olefins such as ethylene, propylene, 1-butene and iso-butene; unsaturated carboxylic acids such as acrylic acid, methacrylic acid, crotonic acid, phthalic acid, maleic acid and itaconic acid, salts thereof or mono- or di-$C_1$-$C_{18}$ alkyl esters thereof; (meth) acrylamides, such as (meth)acrylamide, N—($C_1$-$C_{18}$ alkyl)(meth)acrylamide, N,N-dimethyl(meth)acrylamide, 2-(meth)acrylamidopropanesulfonic acid salts and (meth) acylamidopropyldimethylamine or acid salts thereof; N-vinylamides such as N-vinylpyrrolidone, N-vinylformamide and N-vinylacetoamide; vinyl cyanides such as (meth)acrylonitrile; vinyl ethers such as alkyl vinyl ethers, hydroxyalkyl vinyl ethers and alkoxyalkyl vinyl ethers each having an alkyl chain containing 1 to 18 carbon atoms; vinyl halides such as vinyl chloride, vinylidene chloride, vinyl fluoride, vinylidene fluoride and vinyl bromide; vinylsilanes such as trimethoxyvinylsilane; and allyl compounds such as allyl acetate, allyl chloride, allyl alcohol and dimethylallyl alcohol.

Each of these copolymerizable monomers can be used alone or in combination. The amount of the copolymerizable monomers is preferably 0.001 to 80 percent by mole based on the total monomers constituting the vinyl alcohol polymer (B), preferably 0.1 to 50 percent by mol %.

Especially, the preferred vinyl alcohol polymer (B) is an ethylene-vinyl alcohol copolymer. The ethylene unit content of the ethylene-vinyl alcohol copolymer is preferably 0.1 to 50 percent by mole, more preferably 5 to 40 percent by mole and further more preferably 5 to 30 percent by mole. If the vinyl alcohol polymer (B) has too high ethylene unit content, it may not sufficiently work to accelerate crystallization and if the vinyl alcohol polymer (B) has too low ethylene unit content, it may have higher melting point which may invite decomposition in melt molding.

The viscosity-average polymerization degree of the vinyl alcohol polymer (B) can be suitably selected according to the use but is preferably 200 to 2,000, and more preferably 250 to 1,500, even more preferably from 750 to 1,200. A vinyl alcohol polymer (B) having a viscosity-average polymerization degree less than 200 may invite insufficient strength, in particular remarkably low impact strength at low temperatures of the molded article. In contrast, a vinyl alcohol polymer (B) having a viscosity-average polymerization degree exceeding 2,000 may invite underfill and unsatisfactory molding due to a high melt viscosity and low flowability of the resin. The viscosity-average polymerization degree is determined by measuring the limiting viscosity [η] (dl/g) of the completely-saponified vinyl alcohol polymer (B) in water at 30° C. and calculating according to the equation represented by following Formula (3):

Viscosity-average polymerization degree=$([\eta] \cdot 10^3/8.29)^{(1/0.62)}$ (3)

The saponification degree of the vinyl alcohol polymer (B) can be suitably set according to necessity but is preferably 80 to 100 percent by mole and more preferably 85 to 100 percent by mole, even more preferably 90 to 100% by mole. If the saponification degree is less than 80 percent by mole, the resulting molded article comprising the resin composition may have decreased mechanical properties, especially strength and elastic modulus when left to stand at high humidity.

The amount of the vinyl alcohol polymer (B) to the polymer (A) in the resin composition is not specifically limited but is preferably 0.01 to 50 parts by weight, more preferably 0.1 to 25 parts by weight, and further preferably 1 to 10 parts by weight to 100 parts by weight of the polymer (A). If the amount of the vinyl alcohol polymer (B) exceeds 50 parts by weight, the resin composition may show decreased oxygen barrier properties at high humidity. If it is less than 0.01 part by weight, the vinyl alcohol polymer (B) may not sufficiently work to accelerate crystallization and may invite some problems in molding and processing.

The total amount of the polymer (A) and the vinyl alcohol polymer (B) in the resin composition is not specicically limited but is preferably 50 to 100 percent by weight, more preferably 80 to 100 percent by weight and further preferably 95 to 100 percent by weight based on the total weight of the resin composition.

The resinous components can be kneaded according to any suitable procedure. For example, the polymer (A) and the vinyl alcohol polymer (B) can be kneaded by typical melt blending method such as method using common extruder such as laboplastmill, or by solution blending method of dissolving the resins in a solvent, mixing the solution and reprecipitating the resin.

The resin composition has a high crystallization rate and contributes to shorten the time period of heat treatment in molding and processing of the resin composition.

The crystallization rate of the resin composition in terms of half time of crystallization ($t_{1/2}$) determined at a temperature 10° C. lower than the melting point of the polymer (A) may be 2,000 seconds or less, more preferably 1,500 seconds or less, further preferably 1,350 seconds or less, and most preferably 1,200 seconds or less.

The half time of crystallization ($t^{1/2}$) is defined as the time period to attain one half area of the exothermic peak measured with a differential scanning calorimeter when the resin composition is subjected to isothermal crystallization at a temperature 10° C. lower than the melting point of the polymer (A), as described in the examples below.

The resin composition of the present invention can be molded into a single layer or multi layer article and can be used as a material typically for films such as packaging film, sheets and packages.

The resin composition shows excellent gas barrier properties when it is molded typically into a film, sheet or package. The gas barrier properties in terms of oxygen permeability at high humidity of 90% relative humidity are preferably 2 cc·20-μm/m²·day·atm or less, and more preferably 1 cc·20-μm/m²·day·atm or less, as described in the examples below.

EXAMPLES

The present invention will be illustrated in further detail with reference to several examples and comparative examples below, which are not intended to limit the scope of the invention. The measurements in the examples and comparative examples were determined according to the following procedures.

(1) Measurement of Melting Point (Tm) of Polymer (A)

A differential scanning calorimeter (DSC-7, product of Perkin-Elmer Co., Ltd.) was used. A sample was heated from 25° C. to 210° C. at a heating rate of 80° C./minute and maintained for one minute at 210° C. Subsequently, the sample was cooled to 25° C. with a cooling rate of 10° C./minute. The sample was heated again from 25° C. to 210° C. at a heating rate of 80° C./minute. The value of the peak temperature attributed to fusion was defined as the melting point (Tm) of the polymer (A).

(2) Measurement of Crystallization Temperature (Tcc) of the Resin Composition

A differential scanning calorimeter (DSC-7, product of Perkin-Elmer Co., Ltd. ) was used. A sample was heated from 25° C. to 210°C. at a heating rate of 80° C./minute and maintained for one minute at 210° C. Subsequently, the sample was cooled to 25° C. with a cooling rate of 10° C./minute. The peak temperature attributed to crystallization observed in the cooling procedure was defined as the crystallization temperature (Tcc) of the resin composition.

(3) Measurement of Half Time of Crystallization ($t_{1/2}$) of the Resin Composition Using a differential scanning calorimeter (DSC-7, product of Perkin-Elmer Co., Ltd.), the half time of crystallization ($t_{1/2}$) of the resin composition was determined by an isothermal crystallization method. A sample was heated from 25° C. to 210° C. at a heating rate of 80° C./minute and maintained for one minute at 210° C. Subsequently, the sample was cooled to a temperature 10° C. lower than the melting point of the polymer (A) determined in (1) with a cooling rate of 120° C./minute and was subjected to isothermal crystallization at the same temperature. In this procedure, the time period from the beginning of isothermal crystallization to the time when it attains one half area of the exothermic peak attributed to crystallization in the relation diagram between the time and heat quantity was defined as the half time of crystallization ($t_{1/2}$).

(4) Measurement of Oxygen Permeability

Using a press machine, NF-37 (product of Shinto Metal Industries Co., Ltd.), a sample resin composition was pressed at a temperature of 190° C. and a pressure of 9.8 MPa for one minute to thereby yield a hot-pressed film about 200 μm thick. Using the hot-pressed film, the oxygen permeability was determined with an oxygen permeability measuring machine, Model MOCONOX-TRAN 2/20 (product of MODERN CONTROLS INC.) at 20° C. and 90% RH according to the method specified in ASTM D3985-05 (most recent version as of the filing date of this application) (equal pressure method). The oxygen permeability measured at an arbitrary thickness (unit: cc/m²·day·atm) was converted into and indicated as a value in terms of a film with a thickness of 20 μm (cc·20-μm/m²·day·atm).

Referential Example 1

(a) Preparation of Poly(5-cyclooctene-1,2-diol)

In a 3-L separable flask equipped with a thermometer, dropping funnel, reflux tube and stirrer were placed 5-cyclooctene-1,2-diol(320 g, 2.25 mol), 3-cis-hexen-1-ol(2.0 g, 0.02 mol) as a chain transfer agent and tetrahydrofuran (1280 g), and the resulting solution was held to 55° C. To the stirred solution was added dropwise a solution of 1,3-bis(2,4,6-trimethylphenyl)-4,5-dihydroimidazol-2-ylidene(tricyclohexylphosphine)benzylideneruthenium dichloride (0.127 g, 0.15 mmol) as a ring-opening metathesis polymerization catalyst in tetrahydrofuran (5 mL). Thirty minutes later, a solution of ethyl vinyl ether (2 g, 0.028 mol) as a terminating agent in a mixture of methanol (500 g) and tetrahydrofuran (250 g) was added, followed by stirring at room temperature. The reaction mixture was poured into hexane (20 L), the precipitate was separated and recovered by filtration, and the solvent was distilled off under reduced pressure to yield 300 g of poly(5-cyclooctene-1,2-diol).

(b) Preparation of Hydrogenated Derivative of Poly(5-cyclooctene-1,2-diol)

The above-prepared poly(5-cyclooctene-1,2-diol) (300 g) was dissolved in a mixture of tetrahydrofuran (1470 g) and methanol (1230 g), and the resulting solution was placed in a 5-liter autoclave made of Hastelloy-C equipped with a pressure meter, safety valve, hydrogen inlet tube, thermometer, sampling tube and stirrer under nitrogen, followed by addition of tris(triphenylphosphine)rhodium chloride (7 g, 7.6 mmol). The inner atmosphere of the autoclave was then replaced with hydrogen gas three times, the inner temperature of the autoclave was elevated from room temperature to 60° C. over 30 minutes while stirring at a hydrogen pressure of 3.9 MPa and held to the same temperature for five hours. During this procedure, hydrogen gas was fed into the autoclave so as to hold the hydrogen pressure to 3.9 MPa. After cooling to room temperature, the reaction mixture was taken out from the autoclave and poured into methanol (3 L). The solvent was distilled off from the precipitated polymer under reduced pressure to yield a hydrogenated derivative of poly (5-cyclooctene-1,2-diol) (290 g). The molecular weight of the hydrogenated derivative of poly (5-cyclooctene-1,2-diol) was determined by gel permeation chromatography (GPC; developing solution: hexafluoroisopropanol, in terms of standard poly(methyl methacrylate)) to find that it had a number-average molecular weight of 9,800 and a weight-average molecular weight of 26,800. The ¹H-NMR spectrum (DMSO-$d_6$ solution, measurement temperature: 85° C.) at 500 MHz of the polymer shows that the polymer has a hydrogenation degree of 99.9%. The melting point (Tm) of the hydrogenated derivative of poly(5-cyclooctene-1,2-diol) was determined by the above procedure to find to be 145° C.

Example 1

The hydrogenated derivative of poly (5-cyclooctene-1,2-diol) (99 parts by weight) prepared in Referential Example 1(b) and an ethylene-vinyl alcohol copolymer (ethylene unit content: 38 percent by mole, saponification degree: 99.9%, viscosity-average polymerization degree: 1,150) (1 part by weight) were melted and kneaded at 170° C. at 100 rpm for 10 minutes using a Laboplast mill (product of Toyo Seiki Seisaku-sho, Ltd.) and thereby yielded a resin composition. The crystallization temperature (Tcc), half time of crystallization ($t_{1/2}$) and oxygen permeability of the resin composition were determined by the above procedures. The results are shown in Table 1.

Example 2

A resin composition was prepared by the procedure of Example 1, except for using an ethylene-vinyl alcohol copolymer (ethylene unit content: 38 percent by mole, saponification degree: 99.9%, viscosity-average polymerization degree: 750) (1 part by weight) instead of the ethylene-vinyl alcohol copolymer (ethylene unit content: 38 percent by mole, saponification degree: 99.9%, viscosity-average polymerization degree: 1,150) (1 part by weight). The crystallization temperature (Tcc), half time of crystallization ($t_{1/2}$) and oxygen permeability of the resin composition were determined by the above procedures. The results are shown in Table 1.

Example 3

A resin composition was prepared by the procedure of Example 1, except for using an ethylene-vinyl alcohol copolymer (ethylene unit content: 47 percent by mole, saponification degree: 99.9%, viscosity-average polymerization degree: 810) (1 part by weight) instead of the ethylene-vinyl alcohol copolymer (ethylene unit content: 38 percent by mole, saponification degree: 99.9%, viscosity-average polymerization degree: 1,150) (1 part by weight). The crystallization temperature (Tcc), half time of crystallization ($t_{1/2}$) and oxygen permeability of the resin composition were determined by the above procedures. The results are shown in Table 1.

Example 4

The hydrogenated derivative of poly(5-cyclooctene-1,2-diol) prepared in Referential Example 1(b) (99.9 parts by weight) and an ethylene-vinyl alcohol copolymer (ethylene unit content: 38 percent by mole, saponification degree: 99.9%, viscosity-average polymerization degree: 1,150) (0.1 part by weight) were melted and kneaded at 170° C. at 100 rpm for 10 minutes using a Laboplast mill and thereby yielded a resin composition. The crystallization temperature (Tcc), half time of crystallization ($t_{1/2}$) and oxygen permeability of the resin composition were determined by the above procedures. The results are shown in Table 1.

Example 5

The hydrogenated derivative of poly (5-cyclooctene-1,2-diol) prepared in Referential Example 1(b) (90 parts by weight) and an ethylene-vinyl alcohol copolymer (ethylene unit content: 38 percent by mole, saponification degree: 99.9%, viscosity-average polymerization degree: 1,150) (10 parts by weight) were melted and kneaded at 170° C. at 100 rpm for 10 minutes using a Laboplast mill and thereby yielded a resin composition. The crystallization temperature (Tcc), half time of crystallization ($t_{1/2}$) and oxygen permeability of the resin composition were determined by the above procedures. The results are shown in Table 1.

Example 6

A resin-composition was prepared by the procedure of Example 5, except for using an ethylene-vinyl alcohol copolymer (ethylene unit content: 27 percent by mole, saponification degree: 99.9%, viscosity-average polymerization degree: 1,020) (10 parts by weight) instead of the ethylene-vinyl alcohol copolymer (ethylene unit content: 38 percent by mole, saponification degree: 99.9%, viscosity-average polymerization degree: 1,150) (10 parts by weight). The crystallization temperature (Tcc), half time of crystallization ($t_{1/2}$) and oxygen permeability of the resin composition were determined by the above procedures. The results are shown in Table 1.

Example 7

A resin composition was prepared by the procedure of Example 5, except for using an ethylene-vinyl alcohol copolymer (ethylene unit content: 47 percent by mole, saponification degree: 99.9%, viscosity-average polymerization degree: 810) (10 parts by weight) instead of the ethylene-vinyl alcohol copolymer (ethylene unit content: 38 percent by mole, saponification degree: 99.9%, viscosity-average polymerization degree: 1,150) (10 parts by weight). The crystallization temperature (Tcc), half time of crystallization ($t_{1/2}$) and oxygen permeability of the resin composition were determined by the above procedures. The results are shown in Table 1.

Example 8

A resin composition was prepared by the procedure of Example 1, except for using an ethylene-vinyl alcohol copolymer (ethylene unit content: 27 percent by mole, saponification degree: 99.9%, viscosity-average polymerization degree: 1,020) (1 part by weight) instead of the ethylene-vinyl alcohol copolymer (ethylene unit content: 38 percent by mole, saponification degree: 99.9%, viscosity-average polymerization degree: 1,150) (1 part by weight). The crystallization temperature (Tcc), half time of crystallization ($t_{1/2}$) and oxygen permeability of the resin composition were determined by the above procedures. The results are shown in Table 1.

Comparative Example 1

The crystallization temperature (Tcc), half time of crystallization ($t_{1/2}$) and oxygen permeability of the hydrogenated derivative of poly (5-cyclooctene-1,2-diol) alone prepared in Referential Example 1(b) were determined by the above procedures. The results are shown in Table 1.

Comparative Example 2

The hydrogenated derivative of poly(5-cyclooctene-1,2-diol) prepared in Referential Example 1(b) (90 parts by weight) was dissolved in dimethyl sulfoxide. Hydrous magnesium silicate (average-particle diameter: 3.2 µm, specific surface area: 25 cm$^2$/g) (10 parts by weight) was added to the solution while stirring in Clearmix (Model CLM-0.8S; product of MTECHNIQUE Co., Ltd) at 30° C. at 10,000 rpm for five minutes. Subsequently, the dispersion was subjected to reprecipitation and removal of dimethyl sulfoxide using methanol. The resulting substance was dried at 50° C. under reduced pressure for 48 hours or longer and thereby yielded a resin composition. The crystallization temperature (Tcc), half time of crystallization ($t_{1/2}$) and oxygen permeability of the resin composition were determined by the above procedures. The results are shown in Table 1.

Comparative Example 3

The hydrogenated derivative of poly (5-cyclooctene-1,2-diol) prepared in Referential Example 1(b) (90 parts by weight) was mixed with silicon dioxide (average-particle diameter: 4.1 µm, specific surface area: 300 cm$^2$/g) (10 parts by weight), and the mixture was melted and kneaded in a Laboplast mill at 170° C. at 100 rpm for 10 minutes and thereby yielded a resin composition. The crystallization temperature (Tcc), half time of crystallization ($t_{1/2}$) and oxygen permeability of the resin composition were determined by the above procedures. The results are shown in Table 1.

TABLE 1

|  | Vinyl alcohol Polymer (B) | Amount (wt %) | Tcc (° C.) | $t_{1/2}$ (sec) | Oxygen permeability (cc·20-µm/m$^2$·day·atm) |
|---|---|---|---|---|---|
| Example 1 | Ethylene-vinyl alcohol copolymer (ethylene unit content: 38% by mole) | 1 | 118 | 1180 | 1 |
| Example 2 | Ethylene-vinyl alcohol copolymer (ethylene unit content: 38% by mole) | 1 | 118 | 1160 | 1 |
| Example 3 | Ethylene-vinyl alcohol copolymer (ethylene unit content: 47% by mole) | 1 | 113 | 1350 | 3 |
| Example 4 | Ethylene-vinyl alcohol copolymer (ethylene unit content: 38% by mole) | 0.1 | 113 | 1240 | 3 |
| Example 5 | Ethylene-vinyl alcohol copolymer (ethylene unit content: 38% by mole) | 10 | 118 | 960 | <0.3 |

TABLE 1-continued

| | Vinyl alcohol Polymer (B) | Amount (wt %) | Tcc (° C.) | $t_{1/2}$ (sec) | Oxygen permeability (cc·20-μm/m²·day·atm) |
|---|---|---|---|---|---|
| Example 6 | Ethylene-vinyl alcohol copolymer (ethylene unit content: 27% by mole) | 10 | 120 | 900 | <0.3 |
| Example 7 | Ethylene-vinyl alcohol copolymer (ethylene unit content: 47% by mole) | 10 | 118 | 1090 | <0.3 |
| Example 8 | Ethylene-vinyl alcohol copolymer (ethylene unit content: 27% by mole) | 1 | 120 | 890 | <0.3 |
| Com. Ex. 1 | None | None | 99 | >3000 | 3.1 |
| Com. Ex. 2 | Hydrous magnesium silicate (particle diameter: 3.2 μm) | 10 | 114 | 1360 | 5 |
| Com. Ex. 3 | Silicon dioxide (particle diameter: 4.1 μm) | 10 | 101 | 3750 | 4 |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A resin composition comprising:
a polymer (A) mainly comprising polymerized structural units represented by Formula (1):

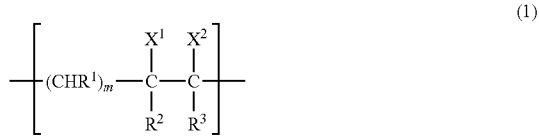

(1)

wherein
m represents an integer of 2 to 10;
$X^1$ and $X^2$ are each a hydroxyl group or a functional group that can be converted into a hydroxyl group;
$R^1$, $R^2$ and $R^3$ are each a hydrogen atom, a hydroxyl group, a functional group that can be converted into hydroxyl group, an alkyl group, an aryl group, an aralkyl group or a heteroaryl group,
wherein the plural $R_1$s may be the same or different from each other; and
a vinyl alcohol polymer (B), wherein the vinyl alcohol polymer (B) is an ethylene vinyl alcohol copolymer having an ethylene unit content ranging from 5 to 40 percent by mole.

2. The resin composition according to claim 1, wherein the polymer (A) comprises 50 mole % or more of the structural units of Formula (1) based on the total number of moles of all structural units in the polymer (A).

3. The resin composition according to claim 1, wherein the resin composition has a half time of crystallization ($t_{1/2}$) of 2,000 seconds or less at a temperature 10° C. lower than the melting point of the polymer (A).

4. The resin composition according to claim 1, wherein the amount of the vinyl alcohol polymer (B) in the resin composition is 0.01 to 50 parts by weight to 100 parts by weight of the polymer (A).

5. A molded article comprising the resin composition of claim 1.

6. The resin composition according to claim 1, wherein the polymer (A) is prepared by a process comprising
subjecting a cyclic olefin compound to ring-opening metathesis polymerization to prepare the polymer (A).

7. The resin composition according to claim 1, wherein the polymer (A) is prepared by a process comprising
subjecting a cyclic olefin compound to ring-opening metathesis polymerization to form a precursor polymer, and hydrogenating the precursor polymer to form the polymer (A).

8. The resin composition according to claim 1, wherein the vinyl alcohol polymer (B) is present in an amount of 10 wt. % or less based on the total weight of the resin composition.

9. The resin composition according to claim 1, wherein the vinyl alcohol polymer (B) is present in an amount of 1 wt. % or less based on the total weight of the resin composition.

10. The resin composition according to claim 1, having an oxygen permeability at 90% relative humidity of 1 cc·20-μm/m²·day·atm or less.

11. The resin composition according to claim 1, wherein the polymer (A) is a hydrogenated poly(5-cyclooctene-1,2-diol).

12. The resin composition according to claim 1, wherein the vinyl alcohol polymer (B) has a saponification degree of 99.5% or greater.

13. A packaging film comprising the resin composition according to claim 1.

14. The resin composition according to claim 1, wherein the polymer (A) consists of polymerized structural units of Formula (1).

15. The resin composition according to claim 1, wherein the resin composition has a halftime of crystallization ($t_{1/2}$) of 1,350 seconds or less at a temperature 10° C. lower than the melting point of the polymer (A).

16. The resin composition of claim 1, wherein the vinyl alcohol polymer (B) has an ethylene unit content of from 5 to 30% by mole.

17. The resin composition of claim 1, wherein in Formula (I) of the polymer (A), at least one of $X^1$ and $X^2$ is a functional group that can be converted into a hydroxyl group, wherein the functional group that can be converted into a hydroxyl group is selected from a epoxy group and a hydroxyl group protected by a protecting group.

18. The resin composition of claim 17, wherein in Formula (I) of the polymer (A), at least one of $X^1$ and $X^2$ is a hydroxyl group protected by a protecting group, and wherein the protecting group is selected from a methyl group, an ethyl group, a t-butyl group, an allyl group, a benzyl group, a phenyl group, a methoxymethyl group, a methoxyethyl group, an ethoxyethyl group, an acetyl group, a propionyl group, a benzoyl group, a methoxycarbonyl group, an ethoxycarbonyl group, a t-butoxycarbonyl group, a phenyloxycarbonyl group, a benzyloxycarbonyl group, a trimethylsilyl group and a t-butyldimethylsilyl group.

19. The resin composition of claim 1, wherein in Formula (I) of the polymer (A), at least one of $X^1$ and $X^2$ is a hydroxyl group.

* * * * *